3,095,310
METHYL CELLULOSE ADDITIVE FOR GREEN MOLDING SAND
Burgess P. Wallace, Brooklyn, and Ronald E. Melcher, Cambria Heights, N.Y., assignors to Whitehead Brothers Company, New York, N.Y., a corporation of New Jersey
No Drawing. Filed May 29, 1961, Ser. No. 113,072
3 Claims. (Cl. 106—38.5)

This invention relates to additives for green molding sands and more particularly to an additive for green molding sands containing methyl cellulose which substantially eliminates common surface defects in castings produced by the green sand mold technique.

In our two copending applications Ser. No. 97,386 and Ser. No. 113,073 we have described the mechanism of green sand mold failure which produces the common types of surface defects known in the art as "rattails," "buckles" and "scabs." Inasmuch as the mechanisms of such surface defects are thoroughly discussed in our copending applications, we will not go into any detail in this application.

Our copending applications Ser. No. 97,386 and Ser. No. 113,073 disclose the use of, on the one hand cross-bonded and chemical starches as an additive material and, on the other hand, the use of specially treated wood flour or other cellulosics in combination with starches including the cross-bonded and other chemical starches. These materials have been found to have excellent properties in that they substantially eliminate the common types of surface defects.

In our investigations we have also found that certain esters of cellulose, more specifically the di-methyl esters of cellulose, commonly referred to as methyl cellulose, are useful as additives to green molding sand compositions as a means of eliminating surface defects in castings. It will be appreciated that in the discussion which follows the art of casting ferrous or non-ferrous metals is included.

It is the principal object of this invention to provide a methyl cellulose additive for green molding sands which substantially eliminates casting surface defects. It is another object to provide an additive for green molding sands which consists essentially of esters of cellulose which have the property of increasing their viscosity as the temperature of water within them rises, which form water suspensions in hot water and which eventually become solid gels in the presence of water at temperatures above 160° F.

There are many types of methyl cellulose materials available and not all of them are suitable for use as green molding sand additives. There are certain basic properties which the material must have in order to be useful. To begin with, the methyl cellulose should not gel or substantially increase in viscosity in cold water. By cold water we mean water which is at a temperature less than 140° F. The material should, however, increase in viscosity very rapidly, form a suspension in water which eventually and quite rapidly forms a solid gel at temperatures above 160° F. The gel should be quite firm since it is the firmness of the material, or its gel strength, which is vitally important in the elimination of surface defects in castings produced in green sand molds including the material of this invention. The methyl cellulose materials which are most useful should have little tendency to absorb water at temperatures below 140° F. but should have their greatest ability to absorb water at a temperature above 160° F. and should be those which, at the same time, give the highest gel strength.

More specifically the methyl cellulose materials which are referred to are those which have a degree of substitution of from 1.6 to 2.03 methoxyl groups on the anhydroglucose rings of the cellulose material. In other words, these materials should be constituted from about 26% to 33% of methoxyl groups.

The amount of the additive material of this invention which is effective to eliminate surface defects is quite small when compared with the total weight of the normal green molding sand compositions. Any amount which is effective in normal foundry compositions to eliminate surface defects is useful. We have found that this amount is, or can be, under certain standard conditions, quite small and seldom is more than about 2% by weight required under even the most severe conditions. In other words, any small but effective amount is sufficient and it is a matter which those skilled in the art will readily be able to determine since to a great extent the precise amount to be used depends on the precise composition of the molding sand and the material which is to be molded.

Examples of the use of the additive of this invention in a standard formulation are as follows:

*Example #1*

1000 lbs. washed and dried silica sand of A.F.S. Fineless No. 70
40 lbs. of southern bentonite (pH 4.7)
20 lbs. (1%) methyl cellulose based on the weight of the base sand
40 lbs. water

*Example #2*

1000 lbs. Albany Molding Sand #0 Grade containing approximately 10% to 15% A.F.S. clay substance
15 lbs. methyl cellulose
70 lbs. temper water

*Example #3*

1000 lbs. returned heap sand (used molding sand)
20 lbs. western bentonite
10 lbs. methyl cellulose
70 lbs. water

*Example #4*

1000 lbs. washed and dried silica sand A.F.S. Fineless Number 150 to 180
80 lbs. southern bentonite
5 lbs. methyl cellulose
60 lbs. water All dry materials are first mixed together for 2 to 3 minutes. The temper water is then added and the combined material mixed for another 2 to 3 minutes. At the end of this time the sand is ready for use. The type of mixing machine is immaterial, although the best results are obtained by a standard mulling machine.

It should be understood that the methyl cellulose material used in the above formulations should be a material having between about 26% to about 33% of methoxyl groups. The use of this type of methyl cellulose material results in the production of perfect castings since the action of the methyl cellulose material within the molding sand composition is quite similar to that described in our copending applications Ser. Nos. 97,386 and 113,073. It is sufficient here to say that the gel formation acts at the critical period in time to prevent the super-concentration of water at a point which will permit the surface of the mold to rupture or separate and in addition the gel assists the clay in holding together the expanding sand grains.

Any of the methyl cellulose materials which are well known in the art which have the properties described

We claim:

1. A green sand mold consisting essentially of a mixture of silica sand, bonding clay, temper water and an amount of an additive consisting of methyl cellulose having its greatest ability to absorb water at temperatures above 160° F. and forming gel structures at temperatures substantially in excess of 160° F. sufficient to prevent the formation of surface defects in castings made using said mixture.

2. The green sand mold set forth in claim 1 wherein the amount of said additive is from a small but effective amount up to about 2% by weight of said sand, clay and water, said amount of said additive being sufficient to prevent rupture of the surface of said mold during the casting of molten metal in said mold.

3. A green sand mold for casting molten metal which consists essentially of a mixture of silica sand, bonding clay, temper water and from about 3/10% to about 2% of an additive material consisting of methyl cellulose having from about 26% to about 33% methoxyl groups by weight, said additive material having its greatest ability to absorb water at temperatures above 160° F. and forming gel structures at temperatures substantially in excess of 160° F.

References Cited in the file of this patent

UNITED STATES PATENTS 2,398,047    Schmidt _____ Apr. 9, 1946

FOREIGN PATENTS 754,823    Great Britain _____ Aug. 15, 1956

OTHER REFERENCES

Ott et al.: High Polymers, volume V, part II, "Cellulose and Cellulose Derivatives," 2nd Edition (1954), published N.Y.C., Interscience Publishers (pages 930–935).